United States Patent
Pettersson et al.

(10) Patent No.: US 10,571,273 B2
(45) Date of Patent: Feb. 25, 2020

(54) CONSTRUCTION SITE REFERENCING

(71) Applicant: HEXAGON TECHNOLOGY CENTER GMBH, Heerbrugg (CH)

(72) Inventors: Bo Pettersson, Luxembourg (LU); Håkan Andersson, Karlskoga (SE); Jonas Wedin, Karlskoga (SE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 413 days.

(21) Appl. No.: 15/466,720

(22) Filed: Mar. 22, 2017

(65) Prior Publication Data
US 2017/0276485 A1    Sep. 28, 2017

(30) Foreign Application Priority Data

Mar. 22, 2016 (EP) ..................................... 16161769

(51) Int. Cl.
*G01C 21/20* (2006.01)
*G01S 11/12* (2006.01)
(Continued)

(52) U.S. Cl.
CPC ........... *G01C 21/20* (2013.01); *B25H 1/0092* (2013.01); *G01C 3/00* (2013.01); *G01C 15/00* (2013.01);
(Continued)

(58) Field of Classification Search
CPC .......... G01C 21/20; G01C 25/00; G01C 3/00; G01C 15/00; G01C 21/206; H04L 65/1069; B25H 1/0092; G01S 5/0263; G01S 17/06; G01S 5/00; G01S 11/12; G01S 19/48; G01S 5/02
See application file for complete search history.

(56) References Cited

U.S. PATENT DOCUMENTS 8,422,035 B2    4/2013 Hinderling et al.
9,043,346 B2    5/2015 Kim et al.
(Continued)

FOREIGN PATENT DOCUMENTS

CN    103886139 A    6/2014
EP    2 053 353 A1    4/2009
(Continued)

OTHER PUBLICATIONS

EP Search Report dated Sep. 19, 2016 as received in Application No. 16161769.1.

*Primary Examiner* — Mischita L Henson
(74) *Attorney, Agent, or Firm* — Maschoff Brennan

(57) ABSTRACT

A method of automated spatial worksite referencing of a networked electronic measuring device with awareness of a rough location information of itself at a worksite location. The method includes querying a database for construction plan information about the rough location and its vicinity and about an actual work progress, computing an actual-state nominal spatial information at the rough location and its vicinity, automatically determining of a fine location of the networked electronic measuring device at the worksite location, by at least one iteration of: automatically determining a measurement point in the vicinity and measuring the measurement point using measurement functionality of the device, and then automatically assimilating the measurement point to the actual-state nominal spatial information and thereby determining the fine location information. When a desired level of accuracy of the determined fine location is not reached, performed another iteration with another additional measurement point is performed.

15 Claims, 4 Drawing Sheets

(51) Int. Cl.
B25H 1/00 (2006.01)
G01C 15/00 (2006.01)
G01S 5/00 (2006.01)
G01C 3/00 (2006.01)
G01S 17/06 (2006.01)
G01S 5/02 (2010.01)
G01S 19/48 (2010.01)
G01C 25/00 (2006.01)
H04L 29/06 (2006.01)

(52) U.S. Cl.
CPC ............ G01C 21/206 (2013.01); G01C 25/00 (2013.01); G01S 5/00 (2013.01); G01S 5/02 (2013.01); G01S 5/0263 (2013.01); G01S 11/12 (2013.01); G01S 17/06 (2013.01); G01S 19/48 (2013.01); H04L 65/1069 (2013.01)

(56) References Cited

U.S. PATENT DOCUMENTS

| | | |
|---|---|---|
| 9,114,493 B2 | 8/2015 | Pettersson et al. |
| 9,200,900 B2 | 12/2015 | Fessler et al. |
| 9,207,078 B2 | 12/2015 | Schorr et al. |
| 2006/0044307 A1* | 3/2006 | Song ................. G06Q 10/06 345/419 |
| 2008/0018912 A1 | 1/2008 | Schreiber |
| 2012/0130675 A1 | 5/2012 | Schorr et al. |
| 2013/0096873 A1* | 4/2013 | Rosengaus ........... G01C 15/002 702/151 |
| 2014/0192159 A1 | 7/2014 | Chen et al. |
| 2014/0268064 A1 | 9/2014 | Kahle et al. |
| 2015/0029489 A1 | 1/2015 | Metzler et al. |
| 2015/0204976 A1 | 7/2015 | Bösch |

FOREIGN PATENT DOCUMENTS

| | | |
|---|---|---|
| EP | 2 453 205 A1 | 5/2012 |
| EP | 2 458 328 A1 | 5/2012 |
| EP | 2 502 712 A1 | 9/2012 |
| EP | 2 620 746 A1 | 7/2013 |
| EP | 2 629 210 A1 | 8/2013 |
| EP | 2 698 602 A1 | 2/2014 |
| EP | 2 781 880 A1 | 9/2014 |
| EP | 3 054 404 A1 | 8/2016 |
| JP | 5489310 B1 | 5/2014 |
| WO | 2015/041689 A1 | 3/2015 |

* cited by examiner

CONSTRUCTION SITE REFERENCING

FIELD OF THE INVENTION

The present invention relates generally to a method for an automated spatial worksite referencing of a networked electronic measuring device, as well as to a corresponding system, as well as to a computer program product.

BACKGROUND

On a construction site, in particular for buildings, most of the work which has to be done requires some kind of spatial reference with respect to the worksite. While in former days a craftsman used pocket rule, square spirit level and construction plan drawings or linguistic instructions, nowadays there are often electronic tools to assist for those tasks.

For example EP 2 698 602 shows a handheld tool for electronic distance measurement (=EDM) with a support that has an angular joint providing angular reference information. Thereby geometrical Data of a room can be gathered. EP 2 458 328 shows a surveillance instrument for measuring and marking points at a construction site. It comprises a laser EDM and angular sensors and can be used for plumbing.

In EP 2 781 880 a construction laser system with a self leveling laser rotator and a laser receiver with calibration functionality is shown. EP 2 053 353 shows a reference line projection unit with an EDM and a visible reference laser beam guided along a defined reference path for projecting a reference line.

EP 2 453 205 shows a surveying instrument with an EDM to determine a distance, angular sensors to determine the orientation and a camera unit. The instrument provides a scanning function for determining a point cloud. The instrument of EP 2 620 746 for surveying and marking spatial coordinates in a room comprises an automatic leveling function for measuring and marking points along a horizontal line at a arbitrary shaped surface.

In EP 2 502 712, a method and system for determining the position of a hand-held power tool on a wall is presented.

The information gathered by such devices is often handled electronically in some Building Information Modeling system, also referenced as BIM. For example, the European patent application Nr. EP 15 153 842, which his herewith incorporated by reference, or EP 2 629 210, US 2014/268064, CN 103886139, JP 5489310, US 2014/192159, etc. mention examples of such Worksite management methods and systems.

Using a point-cloud generating laser-scanner device has the disadvantage that the processing of the point cloud is quite complex, requires lot of computing power and post processing. Capturing such a huge amount of measurement data not only takes a lot of time, but it is often not efficient for daily usage at a construction site, as only a small fraction of the gathered information is actually required and of use. Furthermore, such scanner devices are often damageable and not designed for rough in field usage.

On the other hand, simple handheld measurement tools like electronic distance meters (EDM), electronic levels or the like are often designed too simple, only providing some basic functions and the results are strongly dependent on skills and experience of the operator using them. At most, such handheld devices have very limited data exchange capabilities, so that the operator has to manually document his measurements, which is often a cause of human errors, insufficient or ambiguous information, etc.

Usage of a geodetic instrument like a theodolit or the like would be overkill for most of the applications. Beside the fact that such devices are expensive and require specialized training for the rather complicated usage, such high accuracy is seldom demanded. An ordinary craftsman could not handle such a device, but a skilled specialist would be required, which is not desirable as the general craftsman should be able to handle all his tasks as well as the post-work documentation on his own.

SUMMARY

Some embodiments of the present invention provide a device, method and/or system for executing spatially referenced marking and/or measurement tasks at a construction worksite. Subsequent errors caused by a wrong or inaccurate spatial reference of work done at the worksite can be avoided. This can be achieved automatically, e.g. by a single press of a button by a worker using the device, not requiring specific measurement skills and independent of the actual worker. The spatial referencing can be provided in an accurate and consistent way, independent of the exact location where the device is set up at the worksite. For example simple, random relocatability of the device within one or more worksite tasks can be provided, while keeping spatially referenced with respect to the worksite.

Some embodiments monitor progress and accuracy of construction worksite tasks and to keep the actual state information at the database up to date and in conformance with the real world, in particular in modern highly computerized and automated BIM-environments.

Some embodiments achieve such simply and quickly, by a simple, robust device and avoiding sophisticated geodetical equipment or laserscanners, but providing a simple, automated spatial referencing, even for unskilled workers.

The present invention relates to a method of automated spatial worksite referencing of a networked electronic measuring device. According to the invention, there is a rough location information of the networked electronic measuring device at a construction worksite location ascertained. For example, such ascertaining can be done by determining the rough location information by a GSM or WLAN triangulation, a GPS, an IMU, etc. As another example, the rough location can alternatively or additionally also be ascertained from a worker or a worksite-task to which the device is associated according to a schedule, and which task the rough location at the worksite about which the task will be executed is known. For assistance in determining the rough location information, the device can also comprise an accelerometer for leveling and/or plumbing, a gyroscope, a compass, etc.

The networked electronic measuring device is then querying a database for construction plan information about the rough location and its vicinity or surrounding. For example for machine readable spatial information of the surrounding of the rough location, like about a room at the worksite the device is used in. The database is also queried for an actual work progress, which comprises information about the actual working state, in particular which objects of the construction plan are already finished or not yet present, etc. The database can in particular be a central BIM database at a remote server which is preferably online queried for said information.

Thereof, the networked electronic measuring device, or alternatively a database providing server, is computing an actual-state nominal spatial information at the rough location and its vicinity based on the construction plan information and the actual work progress. Thereby nominal spatial information about the to be expected surrounding of the device are derived.

The device, respectively the method according to the invention is then automatically determining a fine location information—in particular a position and/or alignment information, preferably in six degrees of freedom—of the networked electronic measuring device at the worksite location. Such is done by at least one, preferably multiple, iterations of:

- automatically determining a measurement point in the vicinity. This measurement point is preferably determined by being characteristic for reducing ambiguities and/or increasing accuracy of the rough location information (for the first iteration), respectively of the fine location information (for subsequent iterations);
- measuring the measurement point by the measurement functionality of the networked electronic measuring device, in particular by an opto-electronic distance meter (EDM) or laser rangefinder comprised in the device;
- automatically assimilating the measurement point to the actual-state nominal spatial information. Therein for example one or more of the measurement points can be aligned, fitted, matched, identified, or estimated with their counterparts in the actual state nominal spatial information of the surrounding worksite—a process which gets more and more accurate and unambiguous throughout the iterations. This comprises a determining of the fine location information of the networked electronic measuring device with respect to its surrounding worksite vicinity.

When a desired level of ambiguity and/or accuracy of the determined fine location is not reached, an additional iteration will be initiated with determining, measuring and assimilating an additional different measurement point. Preferably, at least three different measurement points are considered in one or more iterations, preferably more measurement points, but still not a pointcloud-determination as known from laser scanners is established but a plurality of discrete, characteristic measurement points is used.

When otherwise, the desired level of ambiguity and/or accuracy is reached, the fine location information is automatically derived as spatial reference of the networked electronic measuring device with respect to the worksite location.

This worksite reference can then for example be used as spatial reference, which is provided for further tasks at the worksite, in particular for measuring and/or marking tasks by the networked electronic measuring device.

In the method, the automatically determining a measurement point in the vicinity can comprise deriving at least one reference section from the actual-state nominal information, which reference section is characteristic for reducing ambiguities and/or increasing accuracy of the determined fine location information, and selecting the measurement point within this characteristic reference section.

In the method, the assimilating can comprise a fitting of straights or plains to multiple of the measurement points, which plains or straights are corresponding to flats defined in the construction plan information from the database.

The networked electronic measuring device can therein comprise an opto-electronic distance measuring unit (EDM) as at least one of the measurement functionalities, a stationing means for stationing the device at the worksite and a pointing hinge for adjusting the direction of the distance measuring.

The networked electronic measuring device can also comprise a powered deflection unit for deflecting the direction of measurement light of the electronic distance measuring unit, for automatically pointing the distance measuring into ascertainable directions to aim the measurement points. This can be done fully automatically, e.g. by motorized hinges with position encoders.

Another embodiment of the networked electronic measuring device without motorized hinges can comprise an indicator for guiding a user to hand-adjust the pointing hinge to point the distance measurement into the direction towards the measurement point. In particular this can comprise a rough manual adjustment for pointing the measurement substantially in the direction of the measurement point within an accuracy range say e.g. of up to few degrees which is easily feasible by hand adjustment. Preferably, such hand adjustment can be combined with a powered automatic deflection unit for fine adjusting the direction of the measurement light, which has a deflection range covering above said accuracy range, but still being limited e.g. below 90°, in particular below 45°, 30° or of only a few degrees. Thereby, pointing to an exact measurement point can be established without a full range motorized hinge system, but by manual adjustment which simplifies the device and saves energy.

The method according to the invention can also provide feedback to the database in case of out of band deviations of the measurement points compared to the actual state nominal spatial information by providing a dynamic adapting of the construction plan and/or actual-state database.

Once the networked electronic measuring device is referenced to the derived fine location of the networked electronic measuring device, it can be executing further measurements and/or visual marking tasks of defined datum points at the worksite, which tasks can be derived from the database.

The networked electronic measuring device can assimilate its rough location from the database according to database information of a location of a task and/or worker which the networked electronic measuring device is assigned to at the worksite.

The networked electronic measuring device can also or alternatively comprise a location tracking system for ascertaining the rough location as on-site spatial location information with an uncertainty of more than 5 cm or more, like decimeters or meters, in particular comprising a GPS, a SLAM-Navigation, an IMU, radio cell navigation and/or a radio or visual navigation system.

The networked electronic measuring device can comprise a data access unit built for establishing an automatic bidirectional—preferably online and substantially real-time —online wireless data communication link to database data at a remote server means.

Alternatively, the communication link between mobile client device and the server means can be at least occasionally offline. In this case, the querying is done with a pre-work online communication, during which one or more of the database information are downloaded and locally stored at the device for offline access. Then the device can at least occasionally be working offline on worksite, wherein resulting information is locally buffered by the device. When the device can establish an online communication link, for example post-work, an uploading of the buffered resulted information upon establishing an online communication to the server means. In particular, the downloaded and locally stored database information for an offline usage can therein be downloaded in a higher detail level for a defined spatial area around the rough location at the worksite where the device is being used and in a thereto compared lower detail level in adjacence of the rough location. In particular, the wireless communication link can at least occasionally be offline, and be done with

- a pre-work online communication during which one or more of the specific task information, construction plan and actual state information are downloaded and locally stored at the networked electronic measuring device for offline access,
- an at least occasionally offline working of the worker on his specific task, wherein resulting information of the specific task is locally buffered by the networked electronic measuring device, and
- an uploading of the buffered resulting information upon establishing a post-work online communication to the server means.

The device can comprise a camera means for taking an image at the worksite and exchanging the resulting image to the database for an online progress monitoring and/or a documentation as built. The camera means can not only be a camera for taking two dimensional images, but can in particular be a three dimensional camera means, e.g. a stereo imaging means, a RIM-camera, a structured light imaging means or the like. Such a three dimensional camera means can also be used to ascertain the rough location information.

The characteristic for reducing ambiguities and/or increasing accuracy of a location information of the measurement point can therein for example be determined based on the uniqueness of the measurement points adjacence in the actual-state nominal spatial information and on a spatial ambiguity vector calculated in the assimilation of the measurement points.

The level of ambiguity and/or accuracy of the determined location information can therein for example be determined corresponding to a deviation of the measurement points with respect to the actual-state nominal spatial information, in particular according to a statistical parameter of this deviation over a plurality of measurement points. The invention especially relates to a System for an automated spatial referencing of a networked electronic measuring device at a construction worksite with at least one server means, storing a general construction database, the database comprising structured datasets of physical construction components in a hierarchal order that represents the worksite, with machine readable geometrical CAD information and an actual work progress information. The system also comprises the networked electronic measuring device with an opto-electronic distance measurement unit, to be stationed at the worksite, built for carrying out the method according to the invention. In the system, the networked electronic measuring device is built to exchange data with the database at the server means.

The system according to the present invention comprises microcontrollers, microcomputers, DSPs or a programmable or hardwired digital logics, wherefore the present invention can involve a computer program product that is stored on a machine readable medium or embodied as electromagnetic wave (such as e.g. a wired or wireless data signal), which implements functionality according to the invention in software—which therefore is also an embodiment of the invention.

The computer program product comprises program code being configured to execute and operate a program code being configured to derive an actual-state nominal spatial information of a worksite location and its vicinity, based on information gathered from a construction database. Then iteratively loop at least once the sequence of:

- determining a measurement point in the vicinity, which is characteristic for reducing ambiguities and/or increasing accuracy of a location information,
- initiating a measuring of the measurement point by a device and deriving the measurement point result, and
- assimilating the measurement point result to the actual-state nominal spatial information and refining the location information based thereon; until a desired level of ambiguity and/or accuracy of the determined location information is reached. A afterwards the program code is providing the determined location information as fine location information as discussed in this document. In particular, the program code can be carried out on a digital computation unit of a device and/or of a system as presented herein.

BRIEF DESCRIPTION OF THE DRAWINGS

Devices, methods and setups and computer programs according to the invention are described or explained in more detail below, purely by way of example, with reference to working examples shown schematically in the drawing. Specifically.

The diagrams of the figures should not be considered as being drawn to scale. Where appropriate, the same reference signs are used for the same features or for features with similar functionalities. Different indices to reference signs are used to differentiate between different embodiments of a feature which are exemplary shown.

DETAILED DESCRIPTION

Figure 1:
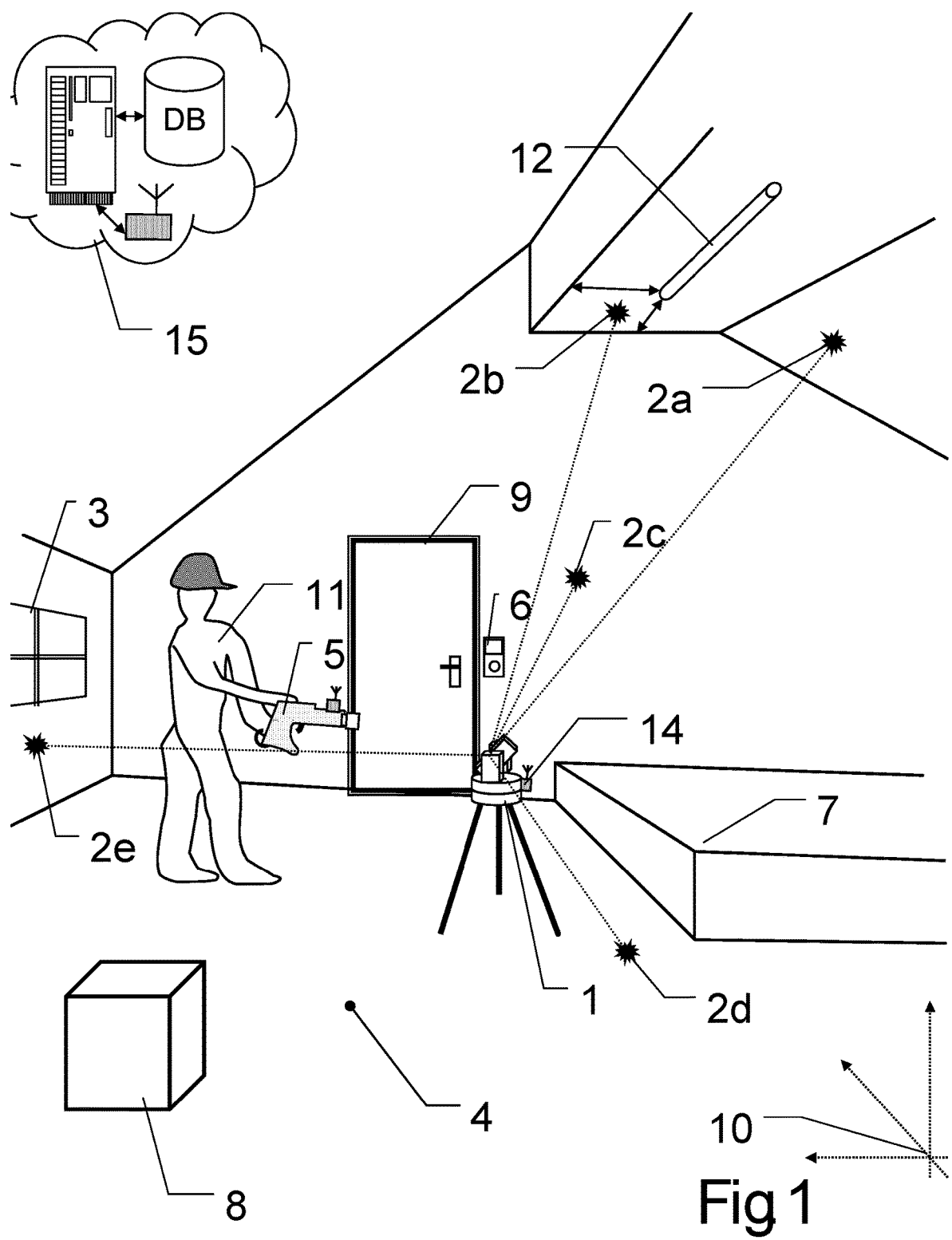
FIG. 1 shows an example of a first embodiment where the present invention is applied at a worksite.

FIG. 1 shows an embodiment of an example of the present invention at a building construction worksite location 4. The human worker 11 has a portable networked electronic measuring device 1 that is built to establish an online communication link to one ore more databases DB, e.g. to one or more BIM server units 15. These server units 15 are storing a general construction database DB, comprising structured datasets of virtual object entities, which are representing the planned or already established physical construction components at the worksite. The database DB—or a synchronized, at least partial copy of it—can be stored locally at the device 1, somewhere at the worksite 4 or remote from the worksite 4. It comprises datasets of CAD-(Computer Aided Design) information of the physical construction components by which the desired construction result will be established. Beside those CAD data in machine readable form, the database DB can also comprise other attribute information of the physical construction components, like supply information, prices, variants, manuals, orders, order confirmations, accounting information. When the construction components are handled by the executing entities, also information like actual serial or lot numbers, manufacturing dates, mounting dates, information about the executing entities, required tools and auxiliary material used, etc.

The data entities of the database DB can be linked in one or more hierarchical structures, which structures represent the desired construction result, wherein the hierarchy can e.g. be based on time, location, logical structures, work packages, executing entities, etc. This hierarchy can for example involve information of the desired linkage of the physical construction components with respect to each other and how to achieve this linkage, e.g. special assembly sequences, tools required, etc. for example comprising auxiliary materials, manuals, structural components, pre manufactured sub-assemblies, assemblies, sections and so on, up to the overall desired construction result. Those hierarchical structures can at least partially be generated automatically by planning software, e.g. according to logical orders, desires schedule, logical dependencies, common practice information, and/or others. Beside the desired end result, the database DB also comprises actual-state information, which reflects the current progress within the build process, wherein the term "actual" is preferably a real time or almost real time state, but can also be updated in batches, e.g. after each task or sub-task has finished and/or at the end of each working day or the like. This actual state can be used to supervise the progress and/or as basis to iteratively fine-plan the following working days schedule. This database DB can e.g. be overseen, managed and/or provided by construction engineers, architects, designers, site supervisors, project owners and/or others, but can also be accessed by accounting, contracting partners, suppliers, conveyances, etc.

Beside a direct link to a local or remote database DB or a presently relevant portion of this database DB, the on-site networked electronic measuring device can optionally also provide a communication link to another on-site device at the worksite, which is providing or forwarding database queries and replies, optionally also in a pre-processed form.

The rough location information of the networked electronic measuring device at the worksite location 4 can e.g. be derived by the networked electronic measuring device itself, e.g. by being built to spatially reference it self, e.g. by GPS, LPS, stationed wireless access points (like WLAN/GSM/ . . . ), etc. Although there is a spatial reference of the networked electronic measuring device known by this, the accuracy and ambiguity of the thereby derived rough location (e.g. in the order of magnitude of meters or decimeters) is not sufficient for any serious measurement task in construction work as it is targeted by the present invention—which in general e.g. requires a referencing in the order of magnitude of centimeters or millimeters. The rough location information can e.g. be information about a certain area, room or section of a room where the networked electronic measuring device is located, because a task from the database has to be accomplished there. The rough location information of the networked electronic measuring device can e.g. also be derived from the task or the human operator, which the networked electronic measuring device is assigned to—as the database comprises information about the at least rough location whereabouts this task has to be done. Another option could be to derive the rough location information of the networked electronic measuring device by capturing one or more digital images of the devices vicinity by the networked electronic measuring device and comparing features of those images with data from the database to identify its rough location according to its surrounding worksite 4.

For example, the here shown coordinate controlled pointing and measurement laser system 1 can be an example of an embodiment of a networked electronic measuring device. By means of a GPS, its wireless network interface 14 and/or a comprised camera,—or simply by assuming that the worker 11 has placed it about the location at which the present task has to be done, it can be provided with the rough location information.

Based on this rough location information, the database DB is queried for spatial information about the rough location and its vicinity or immediate environs. The thereby derived spatially based information from the database is reflected upon an actual state information, which is also derived from the database. This database information constitutes machine readable information about the present spatial environment of the networked electronic measuring device at the worksite 4 where a certain task from the database has to be executed, which information is also referred to as actual-state nominal information.

In this spatial environment of the networked electronic measuring device, at least one measurement point is automatically determined and then surveyed by the networked electronic measuring device's measurement capabilities. The networked electronic measuring device thereby assumes its rough location, or in a further iteration a refined iteration thereof, as its correct actual location and measures in the direction towards the measurement point. When doing so, in addition also further spatial information can be comprised in the assumed rough location and/or orientation or in the refined iteration thereof—for example an orientation derived by a compass and/or a plumb- or level-direction derived by an electronic level or gravity sensor, or the like.

The networked electronic measuring devices 1 spatial information of the measurement point 2a,2b,2c,2d,2e is then automatically assimilated to the actual-state nominal information. By assimilating this reference, a refined iteration of the rough location—or in other words a fine location information—is derived. This fine location is referenced to the worksite 4 or more precisely to the specific portion of the worksite 4 the networked electronic measuring device 1 is located—for example the room in which the networked electronic measuring device 1 is located. This reference is indicated by the shown worksite coordinate system 10.

Above measuring and assimilating is done multiple times to iteratively refine the fine position. Therein, different measurement points 2a,2b,2c,2d,2e are used, which are automatically chosen by the networked electronic measuring device 1. The networked electronic measuring device 1 therein preferably automatically determines the measurement points 2a,2b,2c,2d,2e from the actual state nominal information in such a way, that those measurement points 2a,2b,2c,2d,2e are geometrically best suited to resolve ambiguities or inaccuracies of the presently determined fine location information. For example, measurement points at some finalized, flat, solid construction work, like a finished concrete wall, can be such preferred measurement points 2a,2b,2c,2d,2e in the vicinity of the networked electronic measuring device 1. Preferably the measurement points 2a,2b,2c,2d,2e are chosen to be in sections of the worksite which will not be obstructed in the final construction result and can therefore be used at any time, preferably from beginning to end of the construction. Also measurement points 2a,2b,2c,2d,2e, which are not planed to be subject of further modifications can be chosen as such preferred points. In the embodiments according to the present invention, the determined measurement points 2a,2b,2c,2d,2e are no exactly fixed points, in particular no triangulation stations, fixed markers, reflectors or prisms installed at the worksite 4. Instead, the measurement points 2a,2b,2c,2d,2e according to the invention are not as exactly defined and reproducibly used but only automatically chosen and defined in their location up to a level, which allows a non-ambiguous referencing—but which is not necessarily defined down to a millimeter range, but only within a range that it can be considered to meet a certain feature of the construction. A more exact definition of the measurement point would (at least in the first few iterations) not even be possible since the networked electronic measuring device is only assumed to be located at the rough location, which is in fact not exact but which can have a rather large tolerance or uncertainty, that a certain pointing to an exact measurement point can not be secured. For example, the automatically selected measurement points can be chosen in such a way, that they are in an area of a sufficiently flat surface, so that slight deviation—e.g. based on deviation of the assumed rough location form the real location of the networked electronic measuring device—will not result in completely different measurement points at another worksite feature.

If the fine location is determined up to a defined level of accuracy or confidence—which condition can e.g. be determined if all the measurement points coincident well with the nominal actual state model, within a defined bandwidth—the networked electronic measuring device 1 is spatially referenced at the worksite. Based on this spatial reference outstanding measurement and/or marking tasks from the database can be executed in order to carry out an outstanding worksite-task from the database.

Once the fine location is defined within a predefined margin, but still not accurately enough to be considered final, according to the present invention, the further measurement points can be automatically selected at characteristic points within the nominal actual model derived from the database. For example, such characteristic points can be three or more points defining a plane, two or more points defining a (preferably horizontal or vertical) straight, multiple points defining a (preferably perpendicular) edge or corner, etc. Those characteristic points can in particular be selected in such a way, that they reduce a mathematical uncertainty of a concordance of the actual state nominal model and the real world measurement points taken by the networked electronic measuring device 1, whereof a fine location of the networked electronic measuring device 1 is derivable. Detailed mathematical strategies for doing so can be derived from standard mathematical textbooks.

According to the invention, the networked electronic measuring device 1 can e.g. be moved elsewhere, if it happens to be a bar to the worker 11. It can be set up, removed and re-set up at random, without great effort for the worker 11. For example, it can be removed and/or displaced intermediate of different work phases (like planning and executing or the like) or intermediate between two working days, or even within a working task if it happens to be inconvenient at its present location, etc. Anyway, according to the invention, the worker 11 is not required to set up the networked electronic measuring device 1 at exactly the same, or even at any specific location at the worksite 4, as long as the setup location is sufficiently within range of the present task to be executed and the networked electronic measuring devices 1 rough location information is provided, e.g. as discussed above. After relocation of the networked electronic measuring device 1, the worker 11 can simply press a button to start the automatic referencing sequence according to the present invention as discussed herein—and the networked electronic measuring device 1 will again be spatially referenced at the worksite location as if it hadn't been moved at all. For example in the special case that relocation happens to be in the same room, it will not even be necessary to re-determine the rough location and/or re-query the database for the actual nominal state information of the worksite, but the iteration of the fine location can be started right away, based on the same spatial vicinity information as before.

The above discussed embodiment of a coordinate controlled pointing and measurement laser system as networked electronic measuring device 1 can then e.g. be configured to survey sufficiently accurate spatial location information at the worksite 4, project an indication at defined location at the worksite 4 and/or survey other mobile client devices 5, executing entities 11 and/or construction components (like the window 3, electrical installation 6, pedestal 7, box 8, door 9, light 12. For example the worker 11 can fix the window 3 at the correct location, which location is indicated and/or verified by the networked electronic measuring device 1. In another example, the networked electronic measuring device 1, which has been referenced at the worksite 4 according to the invention as described above, will project laser-light to mark the cut-out required for the electrical installation 6 which has to be made, which location is planed relatively to the door 9 and the floor. Therefore, the networked electronic measuring device 1 will choose the edge of the door 9 and the presently not finished floor as characteristic points to be taken into account during referencing the fine location of the networked electronic measuring device 1. Later on, another worker might use another networked electronic measuring device 1, which also automatically references itself according to the invention, which networked electronic measuring device 1 will then indicate the exact location and orientation to plaster an electric box into the previously made cut-out.

In another example, the networked electronic measuring device 1 which determined its fine location at the worksite 4 according to the invention, will then survey the location of the tool 5 and e.g. log the locations the tool 5 was used, optionally together with usage data like used time, torque, depth, which can be provided from the tool 5 by a wireless link, and then those tool locations and the optional tool usage data can be updated in the construction database at the BIM-Server 15, which can then be used for the "actual state" or "as built information" for further tasks and/or documentation.

As another example, a tool 5, here embodied as a powered screwdriver, drill, etc., has measurement functionality itself, and can itself be an embodiment of a networked electronic measuring device 1 according to the invention, with the same principles of referencing itself as discussed above. Dependent on the thereby derived fine location, the tool 5 can optionally be automatically parameterized in its functionality, e.g. by defining a screwing torque, a drilling depth, etc.

Figure 2:
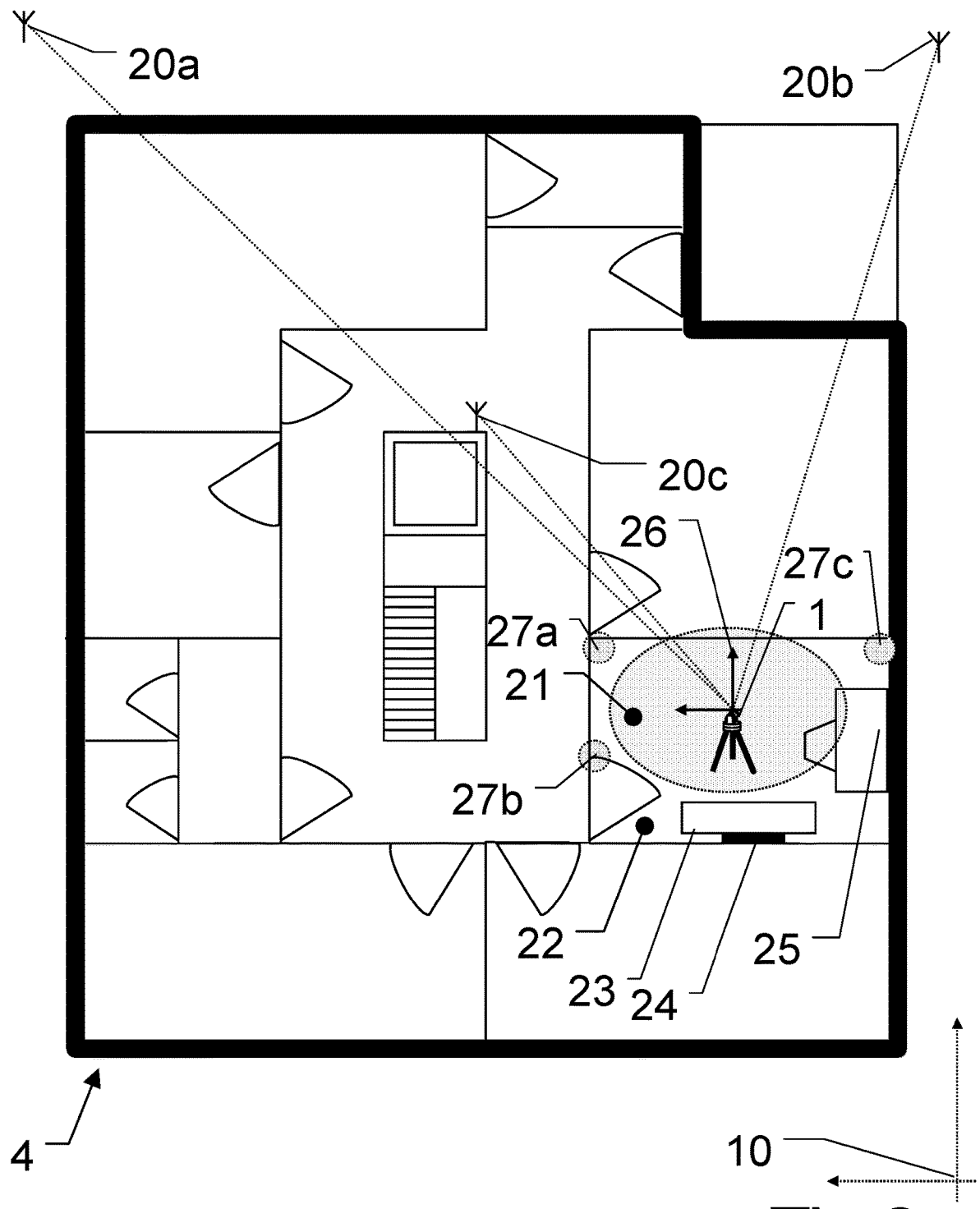
FIG. 2 shows an example of a second embodiment where the present invention is applied at a worksite.

FIG. 2 illustrates another embodiment according to the invention. It shows an example of a floor plan of a worksite 4. Therein, the networked electronic measuring device 1 is placed in one of the rooms 22 by a worker, who is given a certain task to accomplish in that room 22. Initiated by the user, the networked electronic measuring device 1 then uses its measurement and communication functionality to automatically reference itself at the worksite location 21 according to the invention, e.g. as it will be discussed exemplary in the following.

The networked electronic measuring device 1 can therein be aware of its rough location 21, e.g. indicated by the marked area 21, either by knowledge of the worker and/or the worker's given task, knowledge of the room 21, or by a rough location determining unit comprised in the networked electronic measuring device 1. The rough location 21 should be at least as accurate, that the networked electronic measuring device 1 should be non-ambiguously able to identify where about the floorplan it is stationed, e.g. in which room 21, or in other words at least up to an accuracy level by which possible ambiguities can be resolved by the subsequent fine location determination.

For example, there is a networked electronic measuring device 1 according to the invention, which is to be stationed at a worksite 4 location. The device 1 comprises a global referencing system providing rough position information 21. For this purpose, the mobile client device can be equipped with location tracking unit which can e.g. comprise a GNSS-receiver (such as GPS, Galileo or Glonas), a wireless network base location unit (e.g. according to signals from wireless base stations 20c or therefore installed radio beacons 20a or GSM- or WLAN-base-stations 20b, etc., AKA local GPS) or based on visual object recognition, and/or a Inertial Measurement Unit) or any combination thereof. For assistance, an accelerometer for leveling/plumbing and/or a compass can be comprised in the networked electronic measuring device 1.

The rough location 21 can alternatively or additionally also be determined by the associated role and task of the worker, who is using the networked electronic measuring device 1. The networked electronic measuring device 1 can e.g. be built to identify the executing entity who is using it. For example, a personal networked electronic measuring device 1 of an executing worker can be associated to this certain worker or the networked electronic measuring device 1 can identify the worker, which can e.g. be done by a login, a fingerprint, image recognition or by a tag carried by the executing entity, like a RFID, Barcode, QR-Code or the like. Based on this worker, the database can be queried by the networked electronic measuring device 1 for his present task at the worksite 4, which response comprises information about the location of this task at the worksite 4 (at least with a location-accuracy that is sufficient for the rough location 21 according to the invention). Thereby, the rough location can alternatively or additionally be derived from a task/or worker the device is associated to according to schedule.

By this rough location 21 at the worksite—being determined e.g. as discussed above—the networked electronic measuring device 1 queries a central database for construction plan information about the worksite 4 and specifically about the worksite location 21 and its vicinity, e.g. about a room 22 the networked electronic measuring device 1 is in.

Based on above information, the networked electronic measuring device 1 will automatically determine a fine position reference 26 (indicated by the coordinate arrows) with respect to the devices vicinity or surrounding—e.g. with respect to the room 22 the networked electronic measuring device 1 is stationed in—by taking multiple measurements to different measurement points and assimilating (which could also be referred to as some special kind of fitting, aligning, matching, identifying, estimating or the like) those measurement points within the actual state of the nominal construction plan information queried from the database—which nominal information represents the already established construction components at the worksite 4 and their spatial information. This determining of the fine location 26 is done iteratively by repeating the measuring of one or more measurement points and assimilating them with the actual state nominal model, wherein the assumed fine-location 26 (and optionally also the orientation) of the networked electronic measuring device 1 is adjusted to a best fitting solution (e.g. by using a least square algorithm, an N out of M voting, or another mathematical approach).

Based on this fine position 26, the networked electronic measuring device 1 is executing further measurements and/or marking tasks of defined datum points at the worksite which are referenced to the worksite coordinate system 10, respectively to a coordinate system of the room 22.

The assimilating can e.g. comprises an automatically matching of plains to the multiple measurement points, which plains are fitting with nominal flats as defined in the nominal construction plan from the database. For example, the nominal spatial model of the actual state of the worksite, which is gained from the database, is analyzed for plain surfaces. From the rough location of the networked electronic measuring device 1, which is assumed to be the actual location of the networked electronic measuring device 1—although aware that this assumption is probably rather inaccurate—, the networked electronic measuring device 1 is measuring in the direction towards at least three points on such a plain surface, whereupon a flat corresponding to the plain surface is fitted. This flat is then used for referencing the networked electronic measuring device 1, e.g. by determining its normal the normal distance in-between those two. To aid this fitting, a level- or gravity-sensor in the networked electronic measuring device 1 can be used as further rough reference, in particular for referencing the orientation of the networked electronic measuring device 1 with respect to the worksite 4.

In a special embodiment, the rough location can only be provided by the to be assumed actual state spatial vicinity information rather than an explicit actual location and/or orientation information of the networked electronic measuring device 1. The iterative assimilation of the measurement points with the actual state spatial vicinity information is then started with a rather big uncertainty of the actual location of the networked electronic measuring device, but e.g. by knowing plumb-direction from an accelerometer, a measurement of the to be assumed floor-plain and/or ceiling-plain combined with multiple substantially horizontal measurements to assumed walls, can be used to automatically calculate some iterations of the fine location and orientation reference with respect to the actual worksite location where the networked electronic measuring device 1 occurs to be. Once this fine location is iterated to a certain level of confidence (which can be calculated from the assimilation of the measurement points compared to the nominal model) the networked electronic measuring device 1 can automatically determine characteristic reference sections 27a,27b,27c, such as e.g. corners, edges, or other geometrically characteristic features providing high unambiguousness when compared to measurement data. Such characteristic reference sections 27a,27b,27c and the features required to identify them in the actual state nominal model can e.g. be predefined and stored, either at the networked electronic measuring device 1 or at the database. For some following measurement tasks it can also be defined in the database to explicitly take a certain characteristic reference 27a at the worksite 4 as main reference for the following tasks, while neglecting slight deviations of measurement points in other sections. For example, in the database a movable table 25, or a non fixed cupboard 23 can be marked as to be expected present, but not to be used as spatial reference for other spatially fixed construction components. On the other hand, the cupboard 23 can be defined as the mainly considered spatial reference for the task of symmetrically hanging a painting 24 at the wall above or beside the cupboard 23. Another option is also to define movable objects (like the cupboard 23, etc.) as to be referenced separately from the fixed worksite environment and thereby for example reference the whole movable object at the worksite environment 10. As already mentioned, measurement data derived from the measurement points can also be updated at the database, so that the actual state information will be kept current.

The networked electronic measuring device 1 can for example be embodied similar to a device in EP 2 698 602 (preferably with automated movements). The pointing of the measurement and/or indicating light beam of the networked electronic measuring device 1 can preferably be done automatically by means of some motor, but can optionally be done by hand. For hand guidance, the networked electronic measuring device 1 can provide guidance information to the operator in order to enable the operator to point the device to a desired measurement- or marking-point.

In a special embodiment of a hand guidance, an networked electronic measuring device 1 on a stand (like a tripod with a hinged head, etc.) can guide the worker to adjust it only approximately to point into the direction of the desired measurement point, wherefore e.g. an accelerometer and/or a rotary position transducer can be comprised. Then, the hand guided networked electronic measuring device 1 will use an internal deflection unit of limited range (say e.g. below 5, 10 or 20 degree)—like a movable optical component such as a mirror, lens, etc.—to fine adjust the light's alignment towards the desired measurement point.

In yet another special embodiment, the networked electronic measuring device 1 can provide the worker with a 2D or 3D graphical representation of the worksite 4 gathered from the database. By roughly selecting the actual location of the worker at the worksite 4, the worker provides the rough location information. Based on the rough location information—gathered as discussed above or by one of the other options discussed herein—the networked electronic measuring device 1 can provide the worker with a 2D or 3D graphical representation of the actual state nominal spatial information of its rough location, showing a section of the worksite 4, which comprises the desired measurement point. In this graphical representation, the measurement point, or preferably an area inside which the measurement point should be (like a section of a flat surface, etc.), will be graphically marked and the worker will be prompted to direct the measurement beam toward this measurement point or area and to confirm and/or start the measurement. Thereby, characteristic reference sections 27a,27b,27c can be aimed and the referencing according to the present invention can be carried out, in particular e.g. also without the requirement of a propulsion to move and/or rotate the networked electronic measuring device 1 automatically.

Once referenced according to the invention, the here shown example of a tool 1 according to the invention can point a visible measuring laser, so the worker can measure distances and/or angles according to his special on-site task, which measures are referenced to a worksite coordinate system 10. By the laser, the tool can also project light to an exactly referenced desired on-site location, at which the specific on-site task has to be done.

Concerning the construction database queries, the networked electronic measuring device 1 according to the invention is built to establish a bidirectional communication link to the server means. By this link, it can access the structured datasets and their hierarchical structures in the construction database. The communication link can in particular be online and can provide a bidirectional real time communication.

Figure 3:
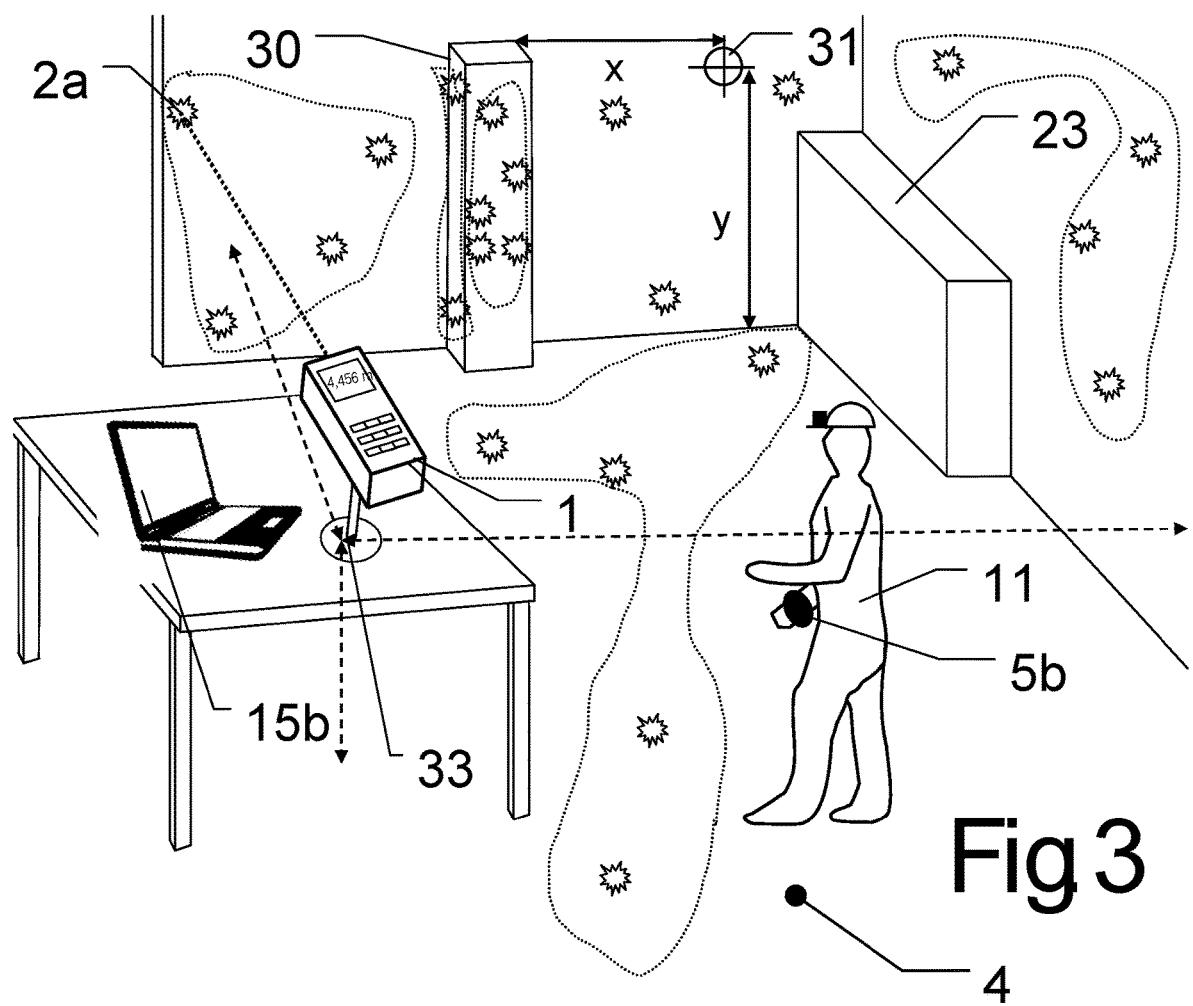
FIG. 3 shows an example of a third embodiment where the present invention is applied at a construction worksite.

FIG. 3 shows an example of an embodiment according to the invention, where there is a referencing according to the invention, followed by a marking operation related to this referencing.

For example, the worker 11 as executing entity has a tool 1 comprising an electronic distance meter, optionally with an electronic level, for gathering on-site real world measurement data like dimensions, level information, etc. This tool 1 can establish a low to medium range local communication link, e.g. by WLAN, Bluetooth, ZigBee or the like, for example within an on-site range of the present place of action, e.g. within some tens of meters, a room or section of a building or a worksite or at the overall worksite. The local communication link in the shown example is established to an on-site client device 15b, for example in form of a static or dynamic local mesh network to exchange configuration and/or measurement data with a database server. Alternatively, the tool 1 can also have direct link to a server hosting a database storing BIM-like information. The online link from the tool 1 to the server means can in this case be established by a global network of wider range, e.g. linked to the internet, like by means of a wired or wireless LAN, a VPN-network, and a mobile link like UMTS, GPRS, or the like.

The networked electronic measuring device 1 is provided with a rough location information—e.g. in a way as discussed above—, so the networked electronic measuring device 1 can query the database for spatial information about its surrounding (or vicinity) according to the actual state of construction. The networked electronic measuring device 1 then measures measurement points 2a in this surrounding and assimilates those with the spatial information of its surrounding, in order to fit the real world spatial measurements with the spatial information form the database and thereby references the networked electronic measuring device 1 with respect to its surrounding (as symbolized by the broken line arrows 33) and thereby with the actual worksite coordination system 10, to which also the worksite planning has a reference.

In the shown example, the measurement points 2 are grouped to represent points corresponding to examples of certain features at the worksite, which can be automatically chosen by a computing unit of the networked electronic measuring device 1 or at the database providing unit 15b to be spatially characteristic and preferably unambiguous for the present surrounding. As the current location of the networked electronic measuring device 1 is not exactly known (which means not known with sufficient accuracy for worksite measuring and/or marking tasks) the locations of the measurement points will at first also be not highly accurate. The networked electronic measuring device according to the invention therefore does multiple iterations of measuring points and assimilating the results with the nominal information from the database, whereby each iteration can resolve ambiguities and result in a fine location information 33, with refined accuracy. For example, the shown measurement points 2a and the other measurement points indicated by equal marks, are shown encircled to certain groups relating to a characteristic feature—which is one preferred option of implementing such an algorithm, but according to the invention, also one, more or all single measurement points can be assimilated. Once the fine location information (indicated by 33) has been sufficiently refined to be accurate enough for the following measurement/marking tasks—which can e.g. be determined from a matching accuracy of the real world measurements with the database information—the networked electronic measuring device 1 is referenced at the worksite 4 and can be provide referenced measurement/marking tasks. If the nominal database information deviates from the real world measurements and ambiguities can not be resolved, the database can be updated with information about the deviations, so that a later on query for the actual state nominal information can comprise information about those deviations, which can be taken into account for further work.

By the on-site spatial location information of the networked electronic measuring device tool 1, which is derived according to the invention as discussed above, the tool 1 can associate its measurements to the physical construction component and to the corresponding object entity in the database. Thereby determined, pre-processed information can be online and in real time be updated at the database, or it can be updated in batches upon discrete time- and/or task-events.

The here shown example is the projection of a marking 31 at a defined worksite location—indicated by the measures x and y—by the tool 1, which is in this case relative to the in the actual state already accomplished installation 30. As it can be seen, in this special embodiment the cupboard 23 which is also present in the actual state was flagged in the database to be not fixedly installed, but moveable, wherefore measurement points in its direction have been avoided.

Figure 4:
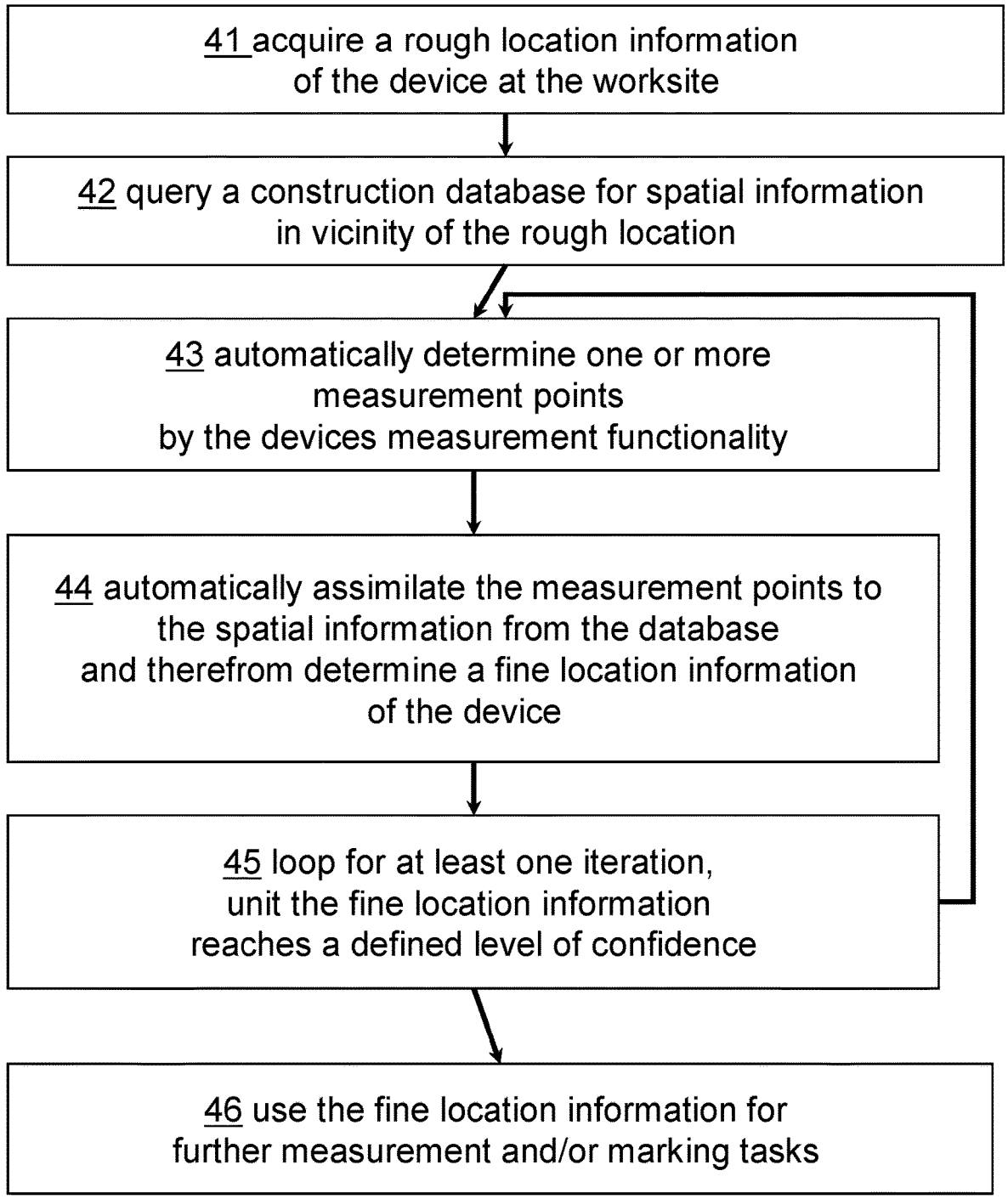
FIG. 4 shows an example of a data flow diagram according to the invention.

FIG. 4 shows an example of a simplified data flow diagram of an embodiment of the present invention.

Box 41 symbolizes, to acquire a rough location information of the networked electronic measuring device at the worksite. This can be done in various ways as discussed above, e.g. by radio position determination, a navigational unit, according to information of the worker and/or task it is associated to, by entry form the worker, etc.

Box 42 symbolizes, to query a construction database for spatial information in vicinity of the rough location. This can be done in various ways as discussed above. For example directly or indirectly via a wireless or wired communication link, directly or indirectly to a database server, synchronizing local copies of the database, etc. The spatial information can in particular comprise machine readable spatial construction data and an actual state information of the construction process that is indicating which construction components have already be established at the worksite and which are not yet present and/or finished.

Box 43 symbolizes, to automatically determine one or more measurement points by the devices measurement functionality. This can be done in at least on of the different ways elaborated above, e.g. by measuring single points, fitting straights, flats, etc. to multiple of the points, by automatically selecting measuring points at characteristic features at the worksite which provide spatial features of low ambiguities like flats, corners, edges, etc. and/or by automatically determining measurement points which preferable to resolve mathematical ambiguities of the presently determined rough or fine location. Therefore s sub-portion of this box can be to automatically select such measurement points in the vicinity—in particular by an algorithm at the networked electronic measuring device and or the database providing unit, which points are substantially fulfilling above criteria of increasing accuracy of the location of the networked electronic measuring device as done in the subsequent boxes.

Box 44 symbolizes, to automatically assimilate the measurement points to the spatial information from the database and thereof determine a fine location information of the device. This can be done in various ways, in particular in one or more of the ways as discussed in this document.

Box 45 symbolizes, to loop for at least one iteration, unit the fine location information reaches a defined level of confidence. The looping comprises the selecting and taking of additional measurement points which are located differently from the previous ones and comparing those to the nominal information from the database with the aim to minimize deviations. Therein the, according to the invention at first only roughly assumed location of the networked electronic measuring device, is iteratively refined to a more and more accurate fine location of the networked electronic measuring device, which corresponds to the actual location of the device at the worksite, so that the networked electronic measuring devices location and/or orientation with respect to the worksite will be referenced (to level of accuracy being sufficient with respect to the following task to be accomplished by the networked electronic measuring device.

Box 46 symbolizes, use the fine location information for further measurement and/or marking tasks or other proposes which require a spatial reference with respect to the worksite, which is now given by the fine location information A skilled person is aware of the fact that details, which are here shown and explained with respect to different embodiments, can also be combined with details from other embodiments and in other permutations in the sense of the invention.

What is claimed is:

1. A method of automated spatial worksite referencing of a networked electronic measuring device, the method comprising:
    ascertaining a rough location of the networked electronic measuring device at a worksite location;
    querying a database for construction plan information about the rough location and its vicinity;
    querying the database for an actual work progress, wherein the actual work progress comprises information about an actual state of objects of the construction plan information;
    computing an actual-state nominal spatial information at the rough location and its vicinity based on the construction plan information and the actual work progress; and
    automatically determining a fine location of the networked electronic measuring device at the worksite location, by at least one iteration of:
        automatically determining a measurement point in the vicinity;
        measuring the measurement point by a measurement functionality of the networked electronic measuring devices;
        automatically assimilating the measurement point to the actual-state nominal spatial information and determining the fine location of the networked electronic measuring device;
        when a predetermined level of accuracy of the determined fine location is not reached, determine, measure, and assimilate an additional measurement point in an additional iteration, and
        when the predetermined level of r accuracy is reached, automatically derive the fine location as spatial reference of the networked electronic measuring device with respect to the worksite location.

2. The method according to claim 1, wherein automatically determining a measurement point in the vicinity is performed by at least deriving at least one reference section from the actual-state nominal spatial information, the reference section being characteristic for increasing accuracy of the determined fine location, and
   selecting the measurement point within this characteristic reference section.

3. The method according to claim 1, wherein automatically assimilating the measurement point comprises fitting straights or plains to the multiple measurement points, the plains or straights corresponding to flats defined in the actual computed state nominal spatial information.

4. The method according to claim 1, wherein the measurement functionality of the networked electronic measuring device comprises an opto-electronic distance measuring unit having a direction of distance measurement, and the networked electronic measuring device comprises a means for determining a spatial orientation of the direction of the distance measurement.

5. The method according to claim 4, wherein the networked electronic measuring device comprises a motorized deflection unit for deflecting the direction of measurement light of the electronic distance measuring unit.

6. The method according to claim 4, wherein the networked electronic measuring device comprises an indicator for guiding a user to hand-adjust a pointing hinge about the direction of the measurement substantially towards the measurement point.

7. The method according to claim 1, further comprising providing feedback to actual work progress at the database when out of band deviations of the measurement points are compared to the calculated actual state nominal spatial information by providing a dynamic adapting of the actual work progress and/or the construction plan database.

8. The method according to claim 1, further comprising executing further measurements and/or visual marking tasks of defined datum points at the worksite, the datum points being referenced via the derived fine location of the networked electronic measuring device derived from a workers task from the database by the networked electronic measuring device.

9. A method according to claim 1, wherein the networked electronic measuring device ascertains the rough location from the database according to database information of a location of an upcoming task and/or worker which the networked electronic measuring device is assigned to at the worksite.

10. The method according to claim 1, wherein the networked electronic measuring device comprises a location tracking system for ascertaining the rough location as an on-site spatial location information with an uncertainty of more than 5 cm.

11. The method according to claim 1, wherein the database access is established automatically as a bidirectional real-time online wireless data communication link to database data at a remote server means.

12. The method according to claim 1, wherein the characteristic for increasing accuracy of a location of the measurement point is determined based:
   on the uniqueness of the measurement points adjacence in the actual-state nominal spatial information, and
   on a spatial ambiguity vector which is calculated in the assimilation of the measurement points.

13. A method according to claim 1, wherein the level of accuracy of the determined fine location is determined corresponding to a deviation of the measurement points with respect to the actual-state nominal spatial information.

14. A system for an automated spatial referencing of a networked electronic measuring device at a construction worksite, the system comprising:
   at least one server means, storing a general construction database, the database comprising structured datasets of physical construction components in a hierarchal order that represents the worksite, with machine readable geometrical CAD information and an actual work progress information, and
   the networked electronic measuring device with an opto-electronic distance measurement unit stationed at the worksite, configured to perform the method according to claim 1,
   wherein the networked electronic measuring device is built to exchange data with the database at the server means.

15. A computer program product with program code being stored on a machine readable medium, the program code being configured to derive an actual-state nominal spatial information of a worksite location and its vicinity based on information from a construction database, and then iteratively loop at least once a method comprising:
   determining a measurement point in a vicinity of an electronic measuring device, the measurement point being characteristic for reducing ambiguities and/or increasing accuracy of a fine location information of the electronic measuring device;
   initiating a measuring of the measurement point by a device and deriving the measurement point result;
   assimilating the measurement point result to the actual-state nominal spatial information and refining the fine location information based thereon;
   until a predetermined level of accuracy of the determined fine location information is reached, providing the determined fine location information,
   wherein the method according to claim 1 is carried out on a digital computation unit of a networked electronic measuring device.

* * * * *